United States Patent [19]

Iizuka et al.

[11] Patent Number: 4,656,550
[45] Date of Patent: Apr. 7, 1987

[54] DISK CARTRIDGE

[75] Inventors: Michio Iizuka, Saku; Haruo Shiba, Komoro, both of Japan

[73] Assignee: TDK Corporation, Tokyo, Japan

[21] Appl. No.: 753,143

[22] Filed: Jul. 9, 1985

[30] Foreign Application Priority Data

Jul. 19, 1984 [JP] Japan ............................ 59-109494[U]

[51] Int. Cl.⁴ .............................................. G11B 23/02
[52] U.S. Cl. ..................................................... 360/133
[58] Field of Search ................................... 360/133, 97

[56]         References Cited
          U.S. PATENT DOCUMENTS 4,320,425  3/1982  Hall ........................................ 360/97
4,378,576  3/1983  Roling ................................... 360/137
4,544,977  10/1985  Ozawa et al. ........................ 360/133
4,573,093  2/1986  Obama et al. ......................... 360/97

FOREIGN PATENT DOCUMENTS 2659574  7/1977  Fed. Rep. of Germany ...... 360/133

Primary Examiner—John H. Wolff
Attorney, Agent, or Firm—Oblon, Fisher, Spivak, McClelland & Maier

[57]            ABSTRACT

A disk cartridge comprises a hard casing which receives a magnetic disk with a hub in a rotatable manner and the lower surface of a circular recess of the hub is slightly raised from its outer peripheral portion toward the central opening of the hub in which the driving pin of a driving unit is fitted.

1 Claim, 7 Drawing Figures

DISK CARTRIDGE

BACKGROUND OF THE INVENTION

The present invention relates to a floppy disk. More particularly, it relates to a disk cartridge using a hard casing instead of a thin jacket.

A floppy disk has widely been used as an exchangeable information storage medium which is capable of fitting into a driving unit (a magnetically recording and reproducing device) and of removal from it for storage or transportation in the same manner as a magnetic tape cassette and a disk pack. Eight-inch and five-inch floppy disks have been commonly used. For such floppy discs, a thin flexible jacket made of vinyl chloride has been used as a casing to protect a magnetic disk. In consideration that the thin flexible jacket type floppy disk is insufficient to protect the magnetic disk, there has been proposed a disk cartridge in which a thick, hardly deformable, strong hard case is used and lining sheets are attached to the inner surfaces of the hard case to receive a magnetic disk in a rotatable manner.

FIG. 2 is a perspective view showing the outline of the above-mentioned disk cartridge and FIG. 3 is a longitudinal cross-sectional view of the disk cartridge.

In the Figures, a reference numeral 10 designates an upper hard casing; a numeral 12 designates a lower hard casing and a numeral 14 designates a shutter which covers a window for insertion of a magnetic head (not shown) to protect a magnetic disk 16 received in the disk cartridge when it is in non-use. The magnetic disk 16 is coated with magnetic material on both its surfaces and is provided with a hub 20 at the central portion. The hub 20 includes a central circular recess 22 as the major part and an annular part 24 for connecting the magnetic disk 16, the annular part extending from the outer periphery of the circular recess. The circular recess 22 of the hub faces a magnetic-disk driving window 26 formed in the lower hard casing 12 to substantially cover the window 26 when the disk cartridge is not used, whereby in addition to provision of the shutter 14, protection of the magnetic disk 16 received in the disk cartridge can be easy and operation of the cartridge is simple to thereby increase reliability.

A reference numeral 28 designates a driving pin upwardly extending from a mounting table 30 of the driving unit. The central opening 32 of the hub is fitted to the driving pin in the vicinity of the top end of it, which reaches a bearing part 34 at the center of the upper hard casing 10. Accordingly, there is no magnetic-disk driving window in the upper hard casing 10 and the top end of the driving pin 28 merely comes in contact with the central bearing part 34 formed in the upper hard casing. A supporting member 36 for the hub which may be in a annular form is mounted on the mounting table 30 of the driving unit. The upper surface of the supporting member 36 is in contact with hub 20 so that it supports the hub when rotated. The supporting member 36 has a central opening 38 through which the driving pin 28 extends with an air gap between the cylindrical surface and the inner wall of the central opening 38. A magnet 40 which may be a ringed magnet is provided around the supporting member 36 for supporting rotation of the hub. The magnet 40 is able to attract the hub 20, which may be a metal hub of a ferromagnetic substance such as stainless steel.

FIG. 4 is an enlarged cross-sectional view showing the conventional hub in FIG. 3. As apparent from FIG. 4, a contacting surface of the hub which is in contact with the supporting member 36, namely the lower surface of the circular recess 22 of the hub is slightly depressed from the outer peripheral portion of the circular recess 22 toward the central opening 32 of the hub in which the driving pin 28 is inserted. Accordingly, the hub 20 can not stably be supported by the supporting member 36 when the hub is rotated. Particularly, there takes place oscillation of the hub 20 in the vertical direciton as shown by the arrow mark X even when the metallic hub 20 is attracted by the magnet 40, on account of which contact between the magnetic head (not shown) and the magnetic disk 16 becomes worse, whereby performance of the disk cartridge decreases.

SUMMARY OF THE INVENTION

It is an object of the present invention to eliminate the disadvantage of the conventional disk cartridge and to provide an improved disk cartridge which provides stable support for a hub thereby reducing vertical oscillation of the hub when rotated.

The present invention is to provide a disk cartridge comprising a hard casing which receives a magentic disk with a hub in a rotatable manner, characterized in that the lower surface of a circular recess of the hub is slightly raised from its outer peripheral portion toward the central opening of the hub in which the driving pin of a driving unit is fitted.

DETAILED DESCRIPTION OF THE PREFERRED EMBODIMENTS

The hub of the present invention is generally so constructed that a contacting surface of the hub which is in contact with a supporting member for supporting rotation of the hub is slightly raised from the outer peripheral portion of the hub toward the central opening in which the driving pin is inserted. Difference in height between the outer peripheral portion and the central opening of the contacting surface of the hub is preferably in a range from 0.02 mm to 0.3 mm. A desirable disk cartridge can be obtained by assembling a magnetic disk having the hub constructed as above-mentioned in hard casings in a rotatable manner.

By constructing the hub in such a manner that the contacting surface of the hub which is in contact with the supporting member provided in the driving unit is slightly raised from the outer peripheral portion of the hub toward the central opening of the hub in which the driving pin is inserted, the position of the outer peripheral portion of the contacting surface is lower than the position of the upper surface of the supporting member for supporting rotation of the hub so that the contacting surface hangs over the supporting member. Therefore, the contacting area between the contacting surface of the hub and the supporting member moved outside whereby the hub can be supported by the supporting member in a more stable manner. Further, the distance between the hub and the magnet becomes smaller and an attractive force of the magnet to the hub increases.

Figure 1:
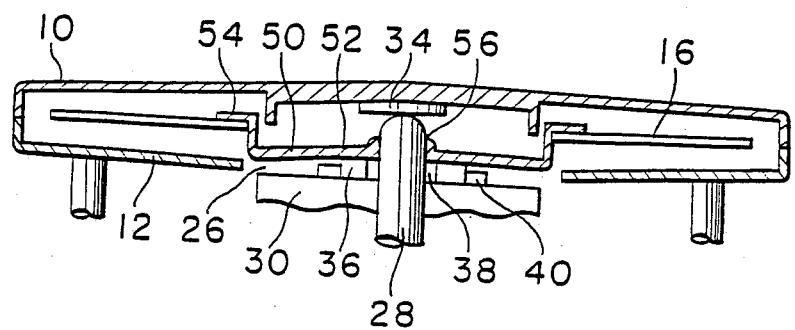
FIG. 1 is a longitudinal cross-sectional view of an embodiment of the disk cartridge according to the present invention.
Figure 2:
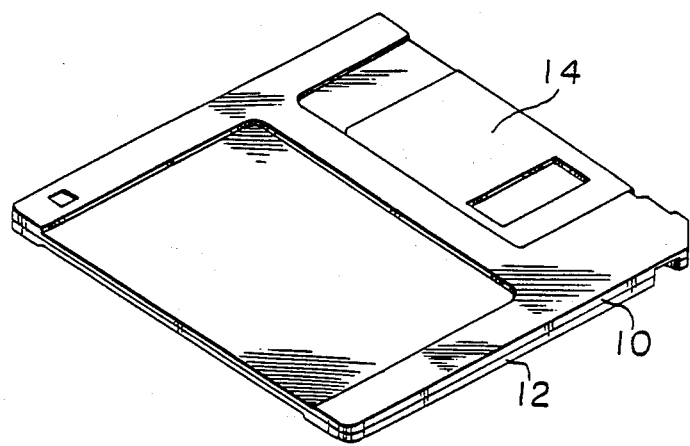
FIG. 2 is a perspective view showing the outline of a conventional disk cartridge.
Figure 3:
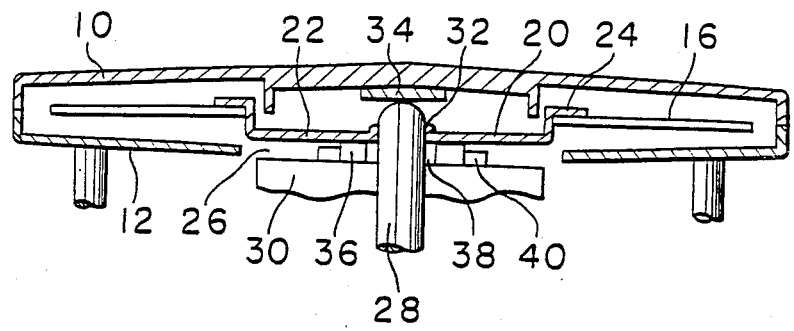
FIG. 3 is a longitudinal cross-sectional view of the cartridge shown in FIG. 2.
Figure 4:
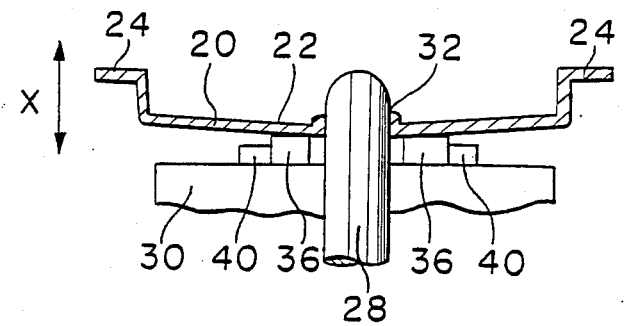
FIG. 4 is an enlarged cross-sectional view of the hub in FIG. 3.
Figure 5:
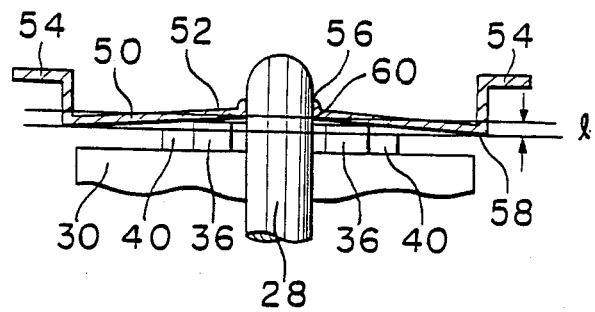
FIG. 5 is an enlarged cross-sectional view of the hub in FIG. 1.

An embodiment of the present invention will be described with reference to FIG. 1 which shows a state where a disk cartridge is mounted on a driving unit and FIG. 5 showing a relation between the hub and the supporting member. In the Figures, the same reference numerals as in FIGS. 3 and 4 designate the same parts and therefore, description of these parts is omitted.

Difference of the disk cartridge according to the present invention from the conventional one is that a contacting surface of the hub which is in contact with the supporting member for supporting rotation of the hub, namely the lower surface of the circular recess of the hub is slightly raised from the outer peripheral portion toward the central opening in which the driving pin is inserted, whereas in the conventional hub, the lower surface of the circular recess is depressed toward the central opening of the hub.

A hub 50 comprises a circular recess 52 formed in its central portion and an annular part 54 around the circular recess 52 to connect the magnetic disk 16. The hub 50 is provided with the central opening 56 formed in the center of the circular recess 52. The driving pin 28, which extends upwardly from the mounting table 30 of the driving unit and passes through the ringed supporting member 36, is fitted to the central opening 56. The contacting surface of the hub which is in contact with the supporting member 36, namely the lower surface of the circular recess 52 of the hub 50, is slightly raised from the outer peripheral portion of the circular recess 52 toward the central opening 56. Accordingly, the outer peripheral portion 58 of the hub 50 is lower than the contacting area of the hub with respect to the supporting member 36, whereby the contacting surface of the hub 50 hangs over the supporting member 36. Accordingly, the contacting area of the contacting surface of the hub 50 with respect to the supporting member 36 shifts outside, whereby the hub 50 can be stably supported by the supporting member 36. Further, the distance between the hub of a ferromagnetic substance and the magnet 40 is reduced to thereby increase an attractive force of the magnet 40 to the hub 50.

Difference in height between the outer peripheral portion 58 of the lower surface of the hub and the central opening 60 is preferably in a range from 0.02 mm to 0.3 mm when the diameter of the circular recess is about 25 mm. However, when the difference in height is greater than 0.3 mm, an angle formed between the contacting surface of the hub 50 and the contacting area of the supporting member 36 becomes too large. Accordingly, a frictional force produced by the contact of these elements increases, on account of which it is necessary to increase a driving force of the driving unit, whereby stability of operation becomes inferior.

Figure 6:
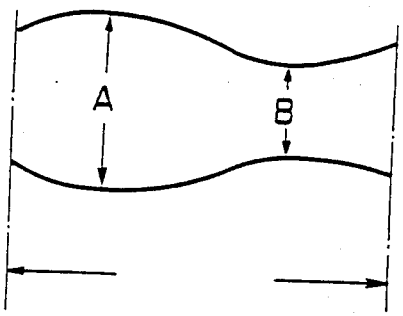
FIG. 6 is a diagram illustrating the definition of modulation.

Table 1 shows comparative data on modulation of disk cartridges affected by the quantity of depression or projection of the hub. The modulation test was carried out in such a manner that a magnetic disk was rotated with its surface contacted with a magnetic head to obtain an output waveform as shown in FIG. 6; the longest dimensional value and the shortest dimensional value in the output waveform were taken and a modulation percent was obtained by calculation of the two values according to the formula of $$\frac{A-B}{A+B} \times 100\%.$$

Smaller values indicate improvement in magnetic characteristic, namely, small variation in output of the magnetic disk. Each modulation percent in the table is respectively an average value of ten samples.

| Quantity of depression or projection (mm) | Modulation (%) in the most inner side track | |
|---|---|---|
| | A surface | B surface (reverse side of A surface) |
| −0.05 | 47.7 | 79.4 |
| 0.0 | 19.0 | 30.6 |
| +0.05 | 7.8 | 7.7 |
| +0.10 | 7.1 | 6.8 |
| +0.20 | 7.6 | 7.8 |
| +0.30 | 7.0 | 7.4 |
| +0.40 | —* | —* |

*It was impossible to measure because of instability in contact between a hub and a supporting member.

Figure 7:
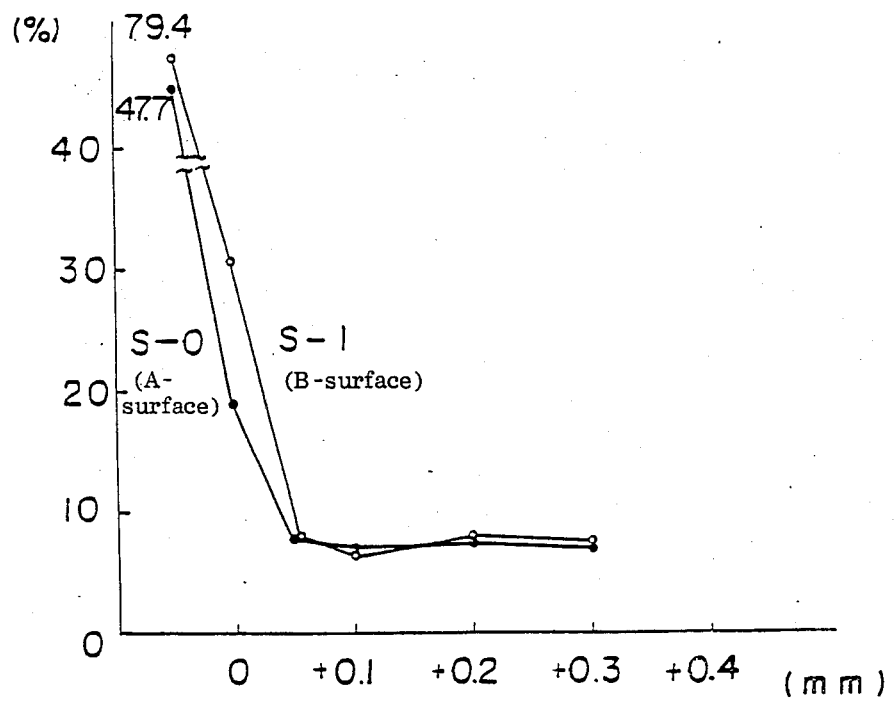
FIG. 7 is a graph showing the magnetic characteristic of the magnetic disk according to the present invention.

FIG. 7 is a graph of modulation percents of the magnetic disk according to Table 1. It is apparent from the figure that the magnetic disk having a hub with the lower surface raised in a range from +0.02 mm to 0.3 mm imparts a remarkable effect in comparison with magnetic disk having a flat surface (depression of 0.0 mm or −0.05 mm).

In accordance with the present invention, the hub can be stably supported for rotation of the magnetic disk whereby oscillation of the hub in the vertical direction can be minimized. Further, good contacting condition between the magnetic head and the magnetic disk can particularly be provided in tracks at the inner circumferential side, whereby performance of the disk cartridge can be improved.

We claim:
1. A disc cartridge having an upper and a lower surface, said lower surface having a window, and
a magnetic disc adapted to be rotated in said hard casing, said magnetic disc including a hub matably fittable in said window so that said lower surface of said hub faces the exterior of said casing centrally of said window,
wherein said lower surface of said hub has an outer peripheral portion and a central opening, and wherein said lower surface of said hub is concave between said outer peripheral portion and said central opening, whereby the concavity of said concave lower surface has a depth of from 0.02 to 0.3 mm, whereby upon rotation of said magnetic disc a modulation percentage is improved.

* * * * *